(12) United States Patent
Kulupana et al.

(10) Patent No.: US 11,616,950 B2
(45) Date of Patent: Mar. 28, 2023

(54) BITSTREAM DECODER

(71) Applicant: British Broadcasting Corporation, London (GB)

(72) Inventors: Gosala Kulupana, London (GB); Andre Seixas Dias, London (GB); Saverio Blasi, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 17/296,793

(22) PCT Filed: Dec. 19, 2019

(86) PCT No.: PCT/GB2019/053636
§ 371 (c)(1),
(2) Date: May 25, 2021

(87) PCT Pub. No.: WO2020/128492
PCT Pub. Date: Jun. 25, 2020

(65) Prior Publication Data
US 2021/0409696 A1 Dec. 30, 2021

(30) Foreign Application Priority Data

Dec. 19, 2018 (GB) ..................... 1820724

(51) Int. Cl.
*H04N 19/11* (2014.01)
*H04N 19/105* (2014.01)
(Continued)

(52) U.S. Cl.
CPC .......... *H04N 19/11* (2014.11); *H04N 19/105* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

| 2007/0047648 A1* | 3/2007 | Tourapis ................ H04N 19/61 375/E7.149 |
| 2017/0272745 A1 | 9/2017 | Liu et al. |

(Continued)

FOREIGN PATENT DOCUMENTS

| WO | 2017123133 A1 | 7/2017 |
| WO | 2018026148 A1 | 2/2018 |

(Continued)

OTHER PUBLICATIONS

International Search Report and Written Opinion for Application No. PCT/GB2019/053636 dated Mar. 19, 2020 (16 pages).

(Continued)

*Primary Examiner* — Chikaodili E Anyikre
(74) *Attorney, Agent, or Firm* — Michael Best & Friedrich LLP

(57) ABSTRACT

The present disclosure relates to: a method of decoding, in a decoder, a bitstream representing an image, wherein the bitstream comprises a plurality of blocks of residual samples, and one or more reconstructed image frames of the image are obtained by adding a respective block of residual samples to a combined hypotheses block of intra-predictions, the combined hypotheses block of intra-predictions being formed by applying a method comprising: receiving the bitstream; for each block of residual samples: determining if a combined intra-prediction hypothesis is indicated and/or inferred from the bitstream and, if so: for each block of residual samples of a block for which a combined intra-prediction hypothesis is indicated and/or inferred: determining a first intra-prediction mode from information extracted from the bitstream; determining or inferring at least a second, different, intra-prediction mode; applying the first intra-prediction mode to at least one reference sample to form a first hypothesis prediction sample; applying the at least one second intra-prediction mode to said at least one (Continued)

reference sample to form a second hypothesis prediction sample; and forming a said combined hypotheses block of predictions by combining the first and second hypothesis prediction samples formed for the block.

16 Claims, 6 Drawing Sheets

(51) Int. Cl.
*H04N 19/159* (2014.01)
*H04N 19/176* (2014.01)
*H04N 19/593* (2014.01)

(56) References Cited

U.S. PATENT DOCUMENTS

| | | | |
|---|---|---|---|
| 2018/0270502 A1 | 9/2018 | Mukherjee et al. | |
| 2019/0020888 A1* | 1/2019 | Liu | H04N 19/147 |
| 2019/0037213 A1* | 1/2019 | Hermansson | H04N 19/61 |
| 2019/0045184 A1* | 2/2019 | Zhang | H04N 19/593 |

FOREIGN PATENT DOCUMENTS

| | | |
|---|---|---|
| WO | 2019013843 A1 | 1/2019 |
| WO | 2018054269 A1 | 3/2019 |
| WO | 2019091292 A1 | 5/2019 |
| WO | 2019209477 A1 | 10/2019 |

OTHER PUBLICATIONS

United Kingdom Intellectual Property Office Search Report for Application No. GB1820724.1 dated Jun. 11, 2019 (4 pages).
Kulupana et al., "Non-CE3: Combined Hypothesis Intra-Prediction", Joint Video Experts Team, BBC, 13th Meeting, Jan. 2019, 4 pages.

* cited by examiner

BITSTREAM DECODER

TECHNICAL FIELD

The invention relates to image encoding and decoding and, in particular, the invention relates to a method of decoding a bitstream to obtain an image.

BACKGROUND

Within an image or video codec, the exploiting of spatial redundancies enables more efficient encoding of an image. One of the most successful intra-prediction schemes consists in performing so-called directional intra-prediction. Each prediction is formed as a weighted average of one or more reference samples; the selection of which reference samples to use, as well as the weights applied to compute the average, depends on the specific intra-prediction direction. There are also non-directional modes of intra-prediction. This disclosure is concerned with intra-prediction and following usages of the terms "prediction" or the like should be understood accordingly.

SUMMARY OF THE INVENTION

In accordance with a first aspect of the present invention, there is provided a method of decoding, in a decoder, a bitstream representing an image, wherein the bitstream comprises a plurality of blocks of residual samples, and one or more reconstructed image frames of the image are obtained by adding a respective block of residual samples to a combined hypotheses block of intra-predictions, the combined hypotheses block of intra-predictions being formed by applying a method comprising:

receiving the bitstream;
for each block of residual samples:
determining if a combined intra-prediction hypothesis is indicated and/or inferred from the bitstream and, if so:
for each block of residual samples of a block for which a combined intra-prediction hypothesis is indicated and/or inferred:
determining a first intra-prediction mode from information extracted from the bitstream;
determining or inferring at least a second, different, intra-prediction mode; applying the first intra-prediction mode to at least one reference sample to form a first hypothesis prediction sample;
applying the at least one second intra-prediction mode to said at least one reference sample to form a second hypothesis prediction sample; and
forming a said combined hypotheses block of predictions by combining the first and second hypothesis prediction samples formed for the block.

In some exemplary embodiment of the invention, for one or more blocks of residual samples of a block for which a combined intra-prediction hypothesis is indicated and/or inferred, the method of forming a combined hypothesis block of intra-predictions comprises, for each residual sample of the block, applying the first intra-prediction mode to a reference sample, applying the second intra-prediction mode to the same reference sample, and combining the resultant first and second hypothesis intra-prediction samples to form a combined hypotheses prediction sample, the method further comprising combining the combined hypotheses prediction samples thus obtained for the block to form said combined hypothesis block of intra-predictions.

In other exemplary embodiments of the invention, for one or more blocks of residual samples for which a combined intra-prediction hypothesis is indicated and/or inferred, the method of forming a combined hypotheses block of intra-predictions comprises applying said first intra-prediction mode to all of the reference samples of the said block to form a plurality of first hypothesis prediction samples, applying the second intra-prediction mode to all of the reference samples of the said block to form a plurality of second hypothesis prediction samples, and combining the first and second hypothesis prediction samples to form said combined hypotheses block of intra-predictions.

Optionally, determining the second intra-prediction mode comprises inferring the second intra-prediction mode based upon the first intra-prediction mode. In this case, inferring the second intra-prediction mode may comprise inferring the second intra-prediction mode is a planar intra-prediction mode if the first prediction mode is not a planar intra-prediction mode.

The second intra-prediction mode may be determined based upon an indicator within the bitstream.

The method of some embodiments may further comprise determining if the first intra-prediction mode is a planar intra-prediction mode; and inferring a combined intra-prediction hypothesis only if the first prediction mode is not a planar prediction mode.

In some embodiments, combining the first and second combined hypothesis intra-prediction samples to form said combined hypotheses block of predictions may comprise adding said first and second hypothesis prediction samples to respective said residual samples. In some embodiments, combining the first and second hypothesis intra-prediction samples to form said combined hypotheses block of predictions may comprise computing a weighted average of the first and second combined hypotheses intra-prediction samples.

In some embodiments, combining the first and second hypothesis intra-prediction samples to form said combined hypotheses block of predictions may comprise determining weightings to be applied to the first and/or second hypothesis samples combining them to form said combined hypotheses block of intra-predictions. In some embodiments, combining the first and second hypothesis intra-prediction samples comprises adding a weighted combination thereof to respective residual samples. Weightings applied to the first and/or second hypothesis intra-prediction samples may optionally be determined based upon the values of bits within the bitstream, or by querying a lookup table, or may be at least partially inferred using information extracted from the neighbouring blocks.

Optionally, at least one of the first intra-prediction mode and the second intra-prediction mode may be a planar intra-prediction mode or a DC intra-prediction mode, or a directional intra-prediction mode.

In some embodiments, the bitstream may comprise one or more bits indicating whether a second directional intra-prediction mode is to be applied. In some embodiments, the bitstream may comprise one or more bits indicating the first intra-prediction mode and/or the second intra-prediction mode to be applied. In this case, determining the first intra-prediction mode and/or the second intra-prediction mode may, optionally, comprise querying a lookup table.

In some exemplary embodiments, the method may further comprise, in respect of a block for which a combined intra-prediction hypothesis is indicated and/or inferred: determining a third intra-prediction mode; and applying the third intra-prediction mode to one or more reference samples to form a third hypothesis intra-prediction sample, and combining the first, second and third hypothesis prediction samples formed for a block, to create a said combined hypotheses block of predictions.

In accordance with another aspect of the invention, there is provided a computer program product adapted to cause a programmable apparatus to implement a method substantially as described above.

In accordance with another aspect of the invention, there is provided a method of decoding images within a video stream using the method substantially as described above.

In accordance with yet another aspect of the present invention, there is provided a method of decoding a video bitstream comprising the steps of:

receiving a bitstream representing blocks of residual samples, and data indicative of intra-prediction hypotheses used in forming the prediction samples;

using said data indicative of said intra-prediction hypotheses to form respective blocks of prediction samples; and adding said blocks of prediction samples to respective said blocks of residual samples to reconstruct images;

characterized by:

for each block of residual samples:

determining if a combined intra-prediction hypothesis is indicated and/or inferred from the bitstream and, if so:

for each block of residual samples of a block for which a combined intra-prediction hypothesis is indicated and/or inferred:

determining a first intra-prediction mode from information extracted from the bitstream;

determining or inferring at least a second, different, intra-prediction mode;

applying the first intra-prediction mode to at least one reference sample to form a first hypothesis prediction sample;

applying the at least one second intra-prediction mode to said at least one reference sample to form a second hypothesis prediction sample; and forming a said combined hypotheses block of predictions by combining the first and second hypothesis prediction samples formed for the block.

In accordance with a further aspect of the invention, there is provided a method of encoding, a video bitstream comprising the steps of:

forming blocks of prediction samples using blocks of intra-predictions and reconstructed image samples;

subtracting blocks of prediction samples from blocks of image samples to form blocks of residual samples; and forming a bitstream representing blocks of residual samples and data representative of blocks of intra-predictions used to form the respective prediction samples;

wherein at least one of the blocks of prediction samples is formed using a combined hypotheses block of predictions formed by:

applying a first intra-prediction mode to the reconstructed image samples of a respective block to form first prediction samples and a plurality of respective first residual samples;

applying a second, different, intra-prediction mode to the reconstructed image samples of said respective block to form second prediction samples and a plurality of respective second residual samples; and forming a block of residual samples by combining the first and second residual samples.

Any feature in one aspect of the disclosure may be applied to other aspects of the disclosure, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the disclosure can be implemented and/or supplied and/or used independently.

The disclosure also provides a computer program and a computer program product comprising software code adapted, when executed on a data processing apparatus, to perform any of the methods described herein, including any or all of their component steps.

The disclosure also provides a computer program and a computer program product comprising software code which, when executed on a data processing apparatus, comprises any of the apparatus features described herein.

The disclosure also provides a computer program and a computer program product having an operating system which supports a computer program for carrying out any of the methods described herein and/or for embodying any of the apparatus features described herein.

The disclosure also provides a computer readable medium having stored thereon the computer program as aforesaid.

The disclosure also provides a signal carrying the computer program as aforesaid, and a method of transmitting such a signal.

The disclosure extends to methods and/or apparatus substantially as herein described with reference to the accompanying drawings.

BRIEF DESCRIPTION OF THE DRAWINGS

The invention will now be described by way of example with reference to the accompanying drawings, in which.

DETAILED DESCRIPTION OF CERTAIN EMBODIMENTS

Figure 1:
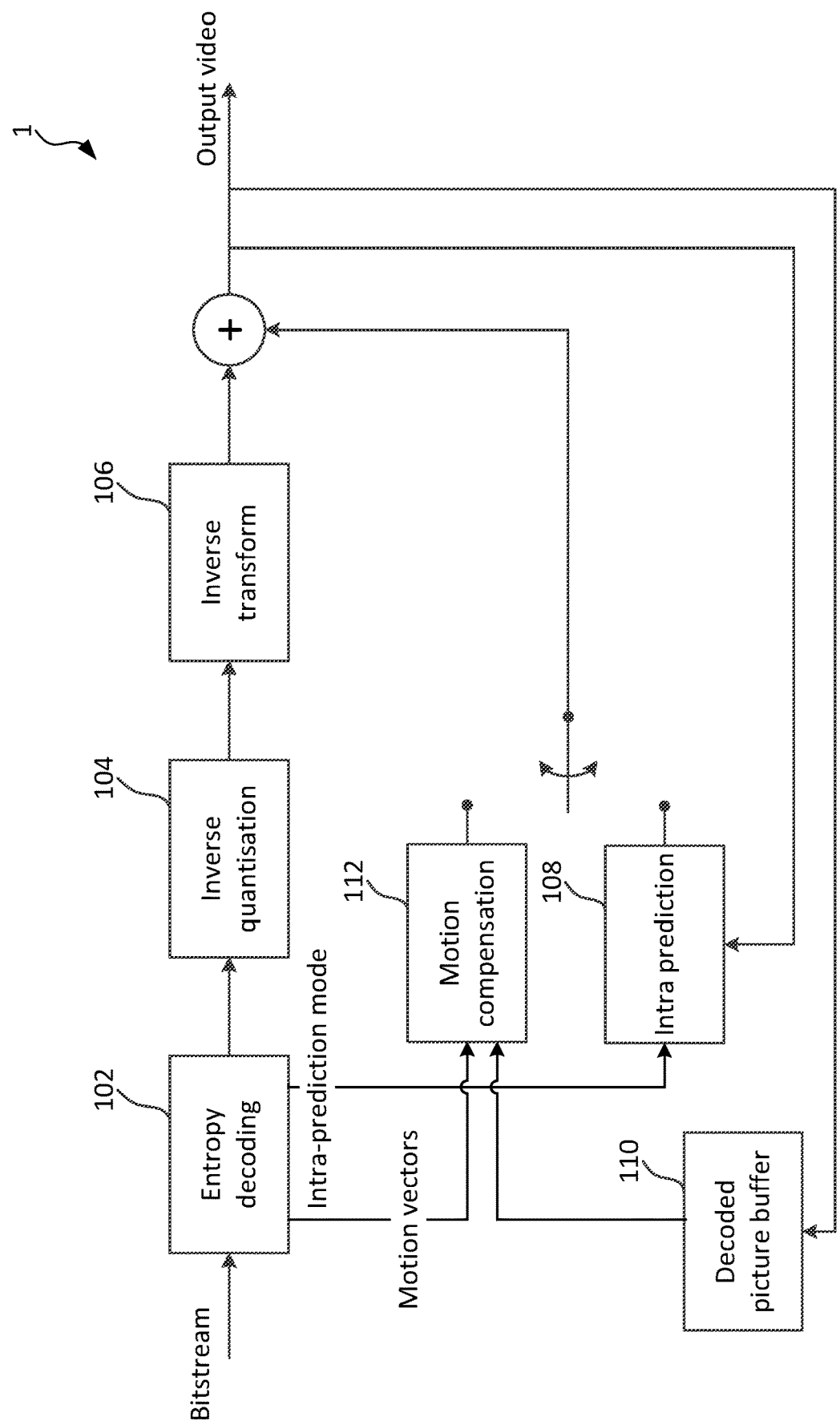
FIG. 1 shows a video bitstream decoder.

There is shown in FIG. 1 a typical decoder in which a bitstream representing video images is received and processed to obtain a video stream. The decoder comprises an entropy decoding stage 102, an inverse quantisation stage 104, and an inverse transform stage 106, via which a received bitstream is sequentially processed usually to obtain residuals.

The residuals are added to respective predictions to obtain output images that form an output videostream.

In the case of inter-prediction, a previous image or images, made available in the decoded picture buffer 110, undergo motion compensation 112, using motion information specified, following information extracted from the bitstream. For example, motion vectors may be signalled in the bitstream. However, such motion information can be computed in numerous alternative ways, as will be known to a person skilled in the art.

In the case of intra-prediction, previously reconstructed samples extracted from the current frame are used to form a prediction.

This disclosure is concerned with intra-prediction block 108 which conventionally uses an intra-prediction mode specified using information extracted from the bitstream, as is described in further detail with reference to FIG. 2.

Figure 2:
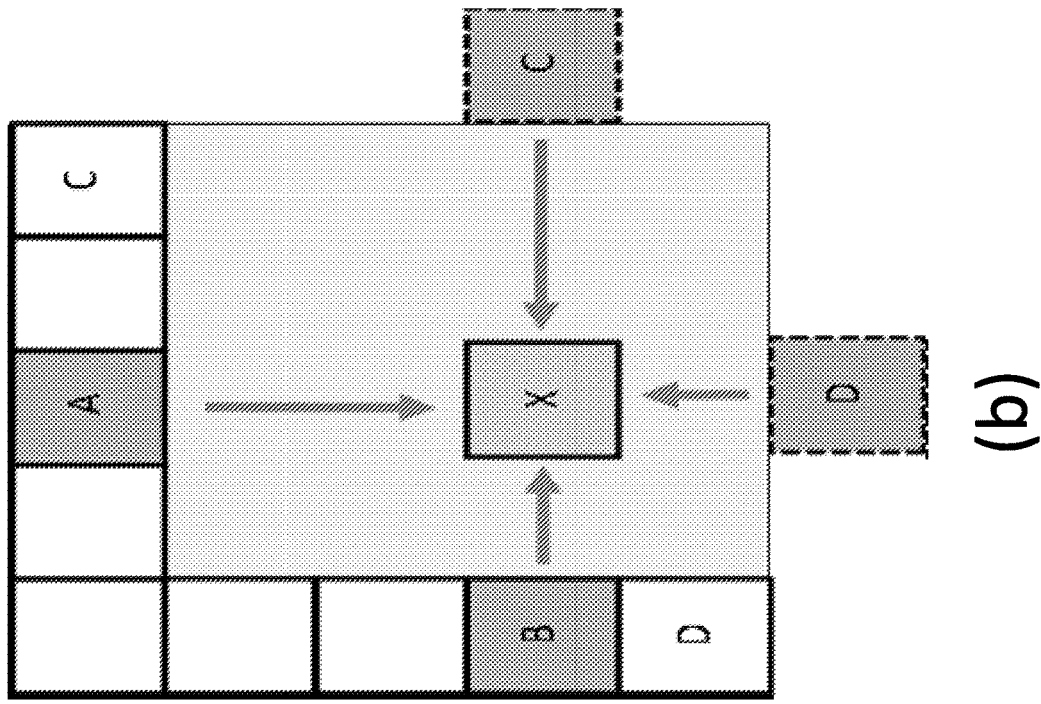
FIGS. 2 (a)-(b) show exemplary block prediction using a single intra-prediction mode.
Figure 2:
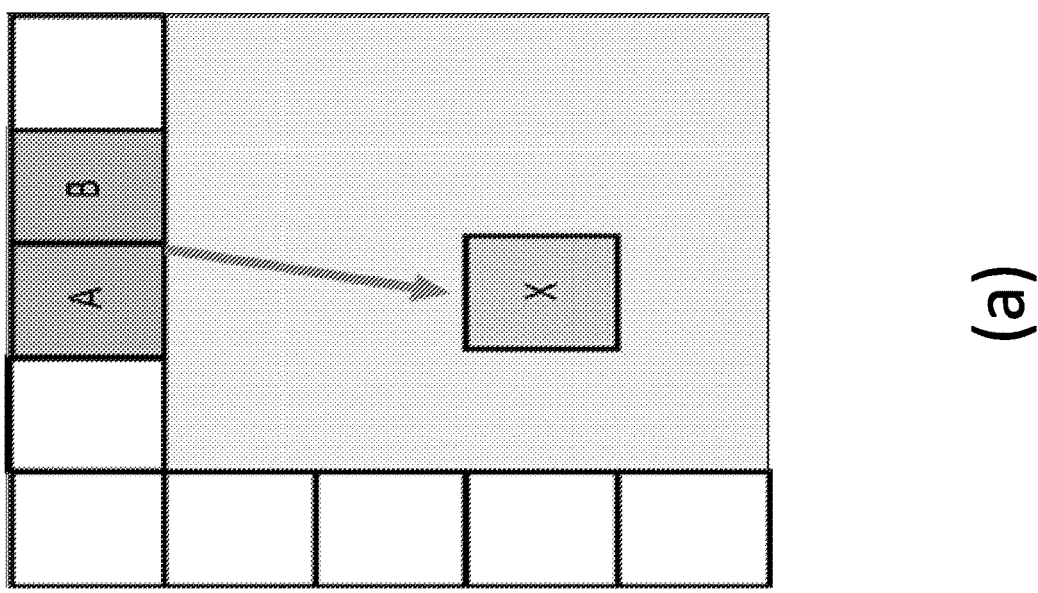

FIG. 2 shows the use of a single intra-prediction mode. The values of each sample within a block are typically (although not necessarily always) predicted as a weighted average of reference samples extracted from the reference sample buffer. The selection of which reference samples to use, as well as the weights applied to each reference sample, depend on an intra-prediction mode specified using information extracted from the bitstream. The prediction mode used in FIG. 2a is a directional intra-prediction mode; the prediction mode used in FIG. 2b is a 'planar' prediction mode. By way of explanation, when using 'planar' intra-prediction, four reference samples are used to predict each sample within the block; two bilinear interpolations are computed using two pairs of reference samples, respectively, where the weights used in the interpolation depend on the location of each sample within the block. The values resulting from the two interpolations are then averaged together to form the final predicted sample.

A range of other directional modes, e.g. 'pure horizontal, and/or non-directional intra-prediction modes, such as the DC mode of the high efficiency video coding (HEVC) standard may also be used. The information needed to correctly select the mode to use is signalled in the bitstream related to each block. The above mentioned prediction modes relate primarily to:
  planar prediction, which consists in obtaining each reference sample as the average of two bilinear interpolations between two pairs of samples extracted from the neighbouring samples on the row on top and on the column on the left of the current block;
  DC prediction, which consists in predicting samples in the block with the average of the reference samples available in the surrounding of the current block; and
  directional prediction, which consists in extrapolating samples inside the prediction block by means of bilinear interpolation, where the weights and samples used depend on a prediction "direction".

As a more specific example, the sample X in the current block in FIG. 2a is predicted using a weighted average of reference samples A and B, which in this example are taken from blocks above the current block. According to the direction specified by the intra-prediction mode, sample A may have a larger impact in the prediction, meaning its weight will be higher than that applied to B when computing the average.

The reference samples here are shown as taken from a single row above and a single column to the left of the current block. In some embodiments, the set of reference samples may be larger, for example there may be two or more reference rows or columns. In some embodiments, the set of reference samples may be filtered using predefined filtering operations before being used for the intra-prediction. Reference samples are typically obtained from blocks that have already been reconstructed in the decoder—and are thus available to predict the current block. Such blocks are conventionally depicted as above or to the left of the current block. This does not preclude operation in other block scanning schemes or degrees of parallel operation.

Conventional intra-prediction makes use of a single mode applied to the reference samples to predict the current block, resulting in the prediction being, for example, one of the prediction X shown within FIGS. 2a and 2b. Each of these predictions is substantially different from the actual content of the block, and FIGS. 2a and 2b show only two of a number of different predictions X obtainable using any one of a number of different single modes.

In some cases, in prior art systems, using a single intra-prediction mode may not provide optimal prediction of the content of the block. In accordance with aspects of the present invention, this problem is sought to be addressed by using a variety of different intra-prediction hypotheses and then combining these hypotheses together to form a combined hypotheses intra-prediction block, which may provide more accurate prediction of at least some blocks in a bitstream than could be obtained using prior art methods that utilise each of the intra-prediction modes in isolation.

Figure 3:
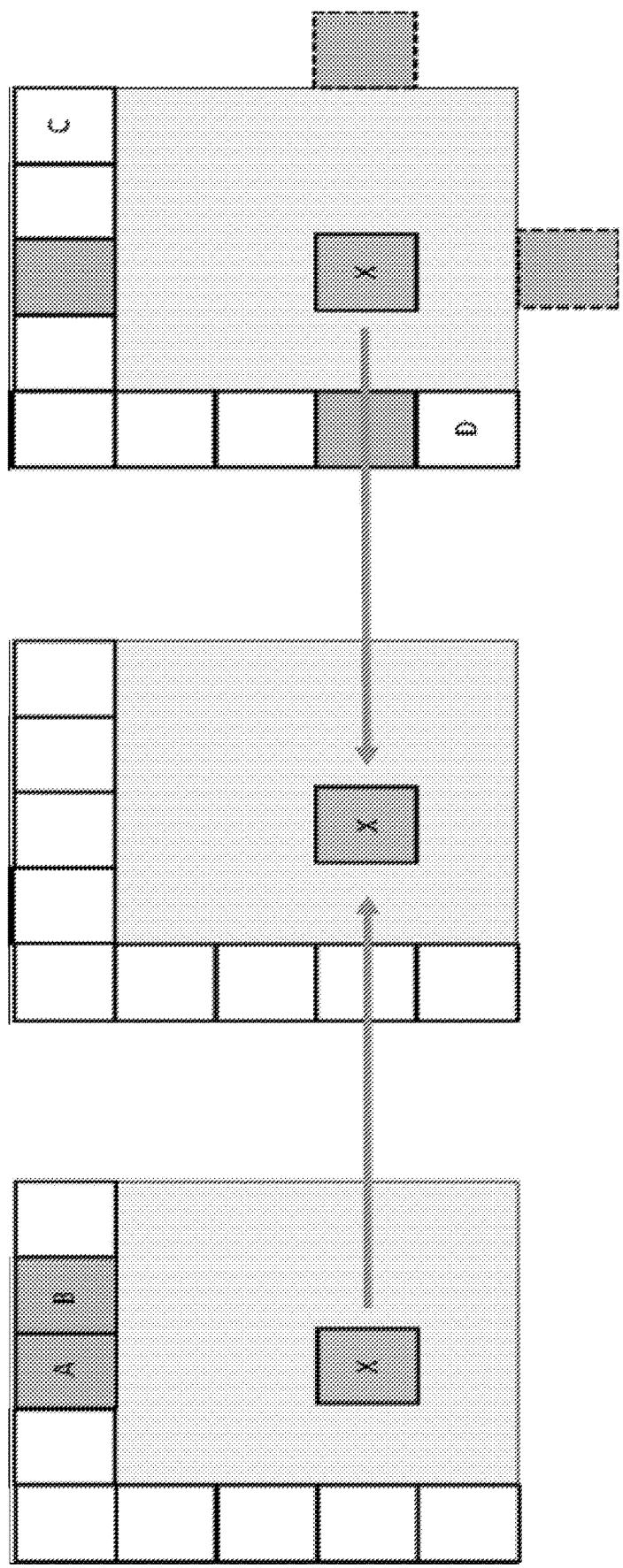
FIG. 3 shows exemplary block prediction using multiple intra-prediction modes.

FIG. 3 shows a method of intra-prediction whereby two different prediction modes are combined to predict the values within a block. This method is may be used to obtain a better prediction of the actual block values. Preferably, the parameters necessary to perform this combination are at least partially extracted from the bitstream to improve image compression. In this example, vertical and planar modes described with reference to FIG. 2b are combined to obtain a better prediction than either of those modes used alone.

Figure 4:
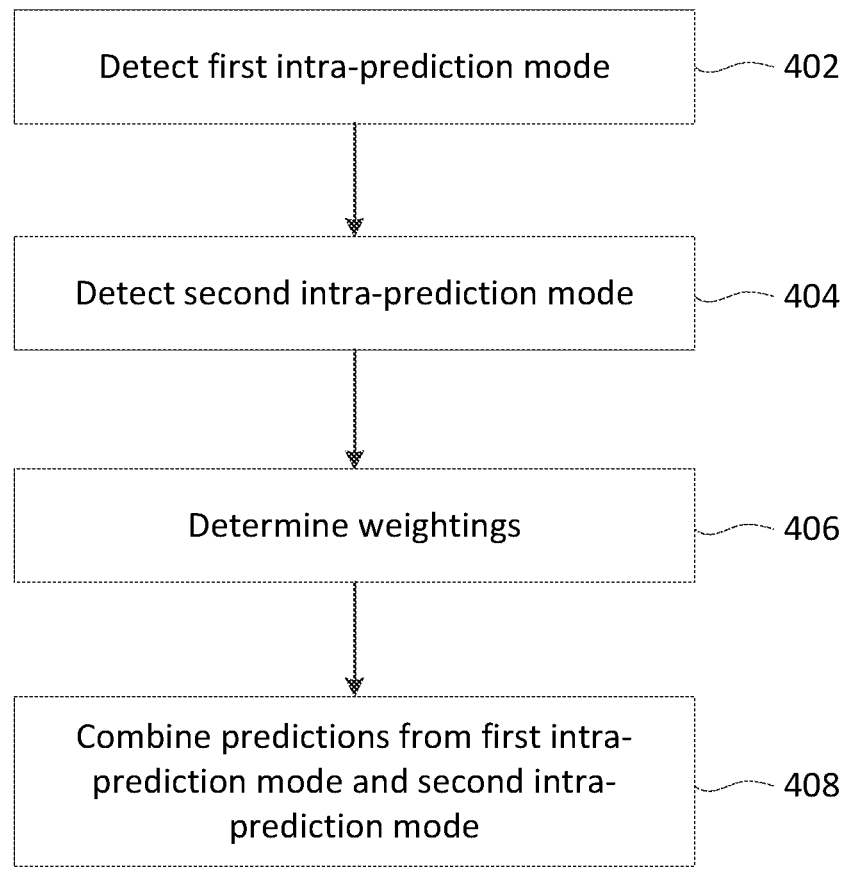
FIG. 4 is a flowchart for a method of using two modes of intra-prediction.

FIG. 4 is a flow chart illustrating a method of applying multiple intra-prediction modes to obtain a combined prediction.

In a first step 402, a first intra-prediction mode is detected. In this embodiment, this comprises detecting an intra-prediction mode specified within the bitstream.

In a second step 404, a second intra-prediction mode is detected. In differing embodiments, this second mode can be detected from an indicator signalled within the bitstream and/or by inference from a feature of the bitstream, such as the first intra-prediction mode. A method of inferring the second intra-prediction mode is described with reference to FIG. 5.

In a third step 406, weightings are determined which are useable to combine predictions ascertained from application of the first detection mode and the second detection mode. In various embodiments, predictions obtained from using each prediction mode are combined into a single prediction, either by means of simple averaging, e.g. the weightings each being 0.5, or by means of a parametric transformation, such as a weighted prediction. In some embodiments, different parametric transformations may be used, such as linear or quadratic interpolations, where the coefficients of the interpolation may be extracted from the bitstream and/or inferred by means of an inference process. The parameters of the transformation, for instance the weights, may be at least partially extracted from the bitstream, may be set by the intra-prediction mode used, or may be pre-set within the decoder.

In some embodiments, the weightings, and/or the combining method to use, is determined using a lookup table, where the index to be used in referencing this lookup table is indicated within the bitstream. The lookup table to be used depends in some embodiments on the prediction modes being used.

In a fourth step 408, the predictions ascertained using each prediction mode are combined using the determined weightings. These predictions can then be combined with residual values extracted from the bitstream to obtain reconstructed image samples. Typically, after a frame is reconstructed, some filters are applied (e.g. deblocking, deblurring, etc.). An image is output thereafter based upon these reconstructed samples. In the case of video decoding, this image is a frame within a video.

Thus, in accordance with aspects of the present invention, the predictions are combined before the combined predictions are added to the residual values.

Figure 5:
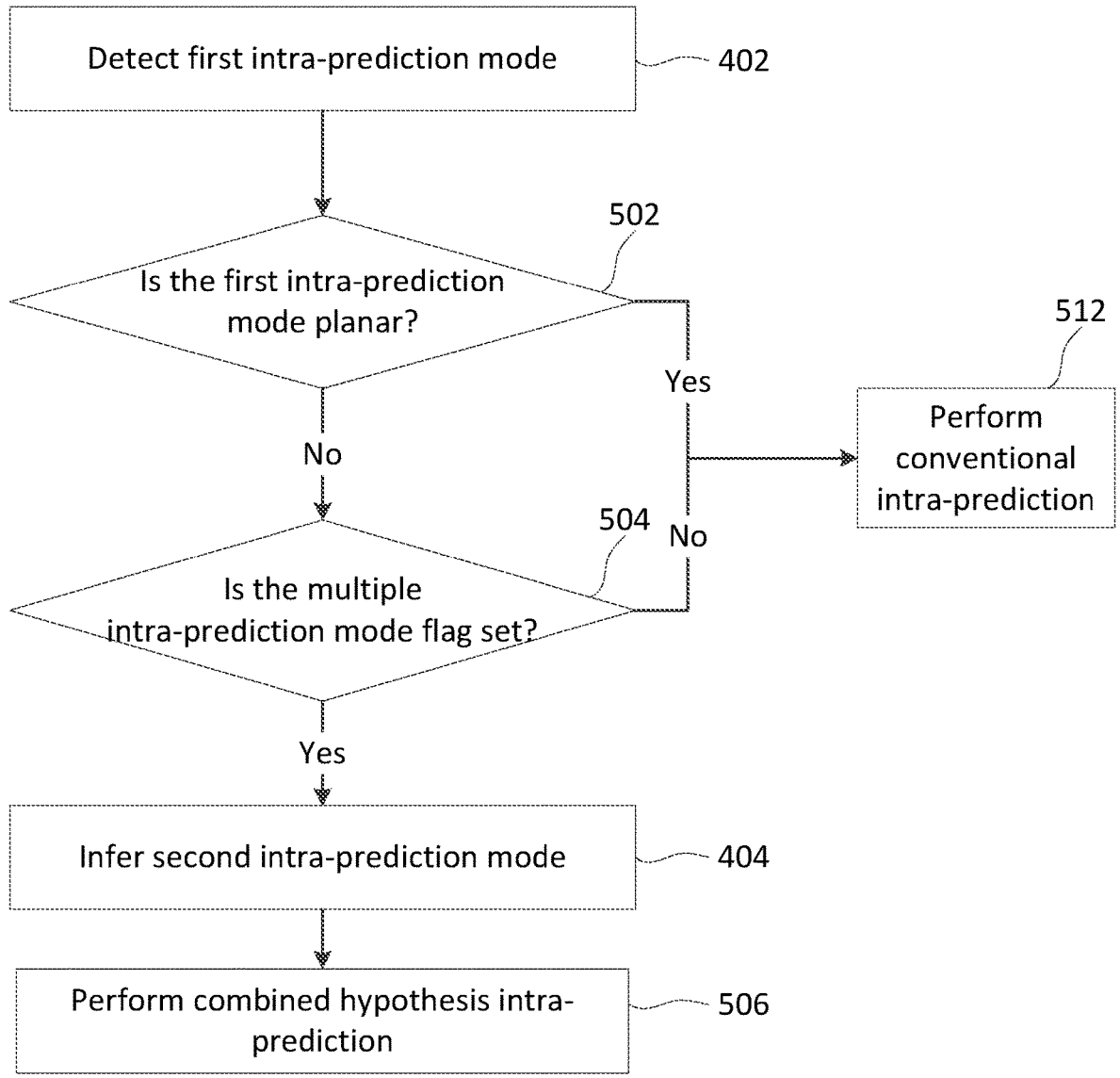
FIG. 5 is a flowchart for a detailed exemplary method of inferring the second mode of intra-prediction.

FIG. 5 illustrates a method according to an exemplary embodiment of the invention wherein the second intra-prediction mode and the use of a second intra-prediction mode is inferred from the first intra-prediction mode.

In a first step 402, the first intra-prediction mode is detected.

In a second step 502, it is determined whether the first intra-prediction mode is planar.

If the first intra-prediction mode is not planar, in a third step 504 it is determined whether a multiple intra-prediction mode flag is set.

If the multiple intra-prediction mode flag is set, in a fourth step 505, the second intra-prediction mode is inferred to be a pre-specified intra-prediction mode, different to the first intra-prediction mode. In this exemplary embodiment, the second intra-prediction mode is inferred to be planar if the first intra-prediction mode is not planar and the multiple (or combined) intra-prediction flag is set. Subsequently, at step 506, a combined hypothesis intra-prediction method as described above is performed.

If the first intra-prediction mode is planar or the multiple intra-prediction flag is not set, in an alternate step 512 conventional intra-prediction is performed using the detected first intra-prediction mode.

While in this embodiment inference of a planar intra-prediction mode as the second intra-prediction mode has been described, similar modes could also be inferred. Similarly, while in this embodiment a flag is checked in the second step 502, if the first intra-prediction mode is not planar, in other embodiments, other modes could be used to determine whether the multiple intra-prediction mode flag should be checked.

In some embodiments, the first intra-prediction mode being determined not to be a specific mode, e.g. planar, is used to infer directly a second prediction mode. That is, the third step 504 is, effectively, skipped. More generally, the determination of the type (e.g. planar, directional, vertical-left) of the first intra-prediction mode may be used to infer either that a second intra-prediction mode should or should not be used or the type of the second intra-prediction mode that is to be used.

In some embodiments, there is a possible, or preferred, second intra-prediction mode or a number of possible or preferred intra-prediction modes for each first intra-prediction mode. In practice, the second intra-prediction mode may be inferred based upon the first intra-prediction mode and the presence of additional bitstream information (where, for example, the first mode being directional and the flag being set may imply a planar second mode, whereas the first mode being DC and the flag being set may imply a 'vertical-left' second mode). More generally, there may be a lookup table, or other reference means, that is useable to determine the second prediction mode where the lookup table used may depend on the first prediction mode. In some embodiments, the second prediction mode may be directly extracted from the bitstream by means of a process similar or identical to the process used to extract the first intra-prediction mode.

In some embodiments the encoding method used depends on the first prediction mode, where a form of coding comparable to Huffman coding is used so that the coding length necessary to indicate the second prediction mode is related to how likely that second prediction mode is to be the optimal prediction mode (this likelihood being predetermined before the decoder/encoder are built).

In preferred embodiments, one of the modes is either a planar mode or a DC mode, where in particular the signalling that one of these modes is not the first prediction mode is, in some embodiments, used to infer the use of the other mode as the second prediction mode. However, this is by no means essential. In some embodiments, the bitstream may simply contain the required information to extract two (or more) different intra-prediction modes and the instruction to combine the two prediction obtained thereby together to form a single (combined) prediction to be added to the respective residual sample(s).

In all cases, the process of forming the combined prediction may be performed in a number of different ways. For example, it may be performed on a sample-by-sample basis. In this case, a first prediction is formed for a given sample using a first intra-prediction mode, next a second prediction is formed for the same residual sample using a second, different intra-prediction mode. Finally, a combined prediction is formed for that residual sample, by combining the first and second predictions, and the process moves on to the next residual sample in the block, where the process is repeated. In alternative embodiments, the process may be performed on a block-by-block basis. In this case, the first intra-prediction mode is applied to all residual samples in the block to form a first block of predictions, next the second intra-prediction mode is applied to all residual samples in the same block to form a second block of predictions. Finally, the first and second block of predictions is combined together to form a single combined hypotheses prediction block and this block is added to the residual samples in the block to reconstruct the image data.

Figure 6:
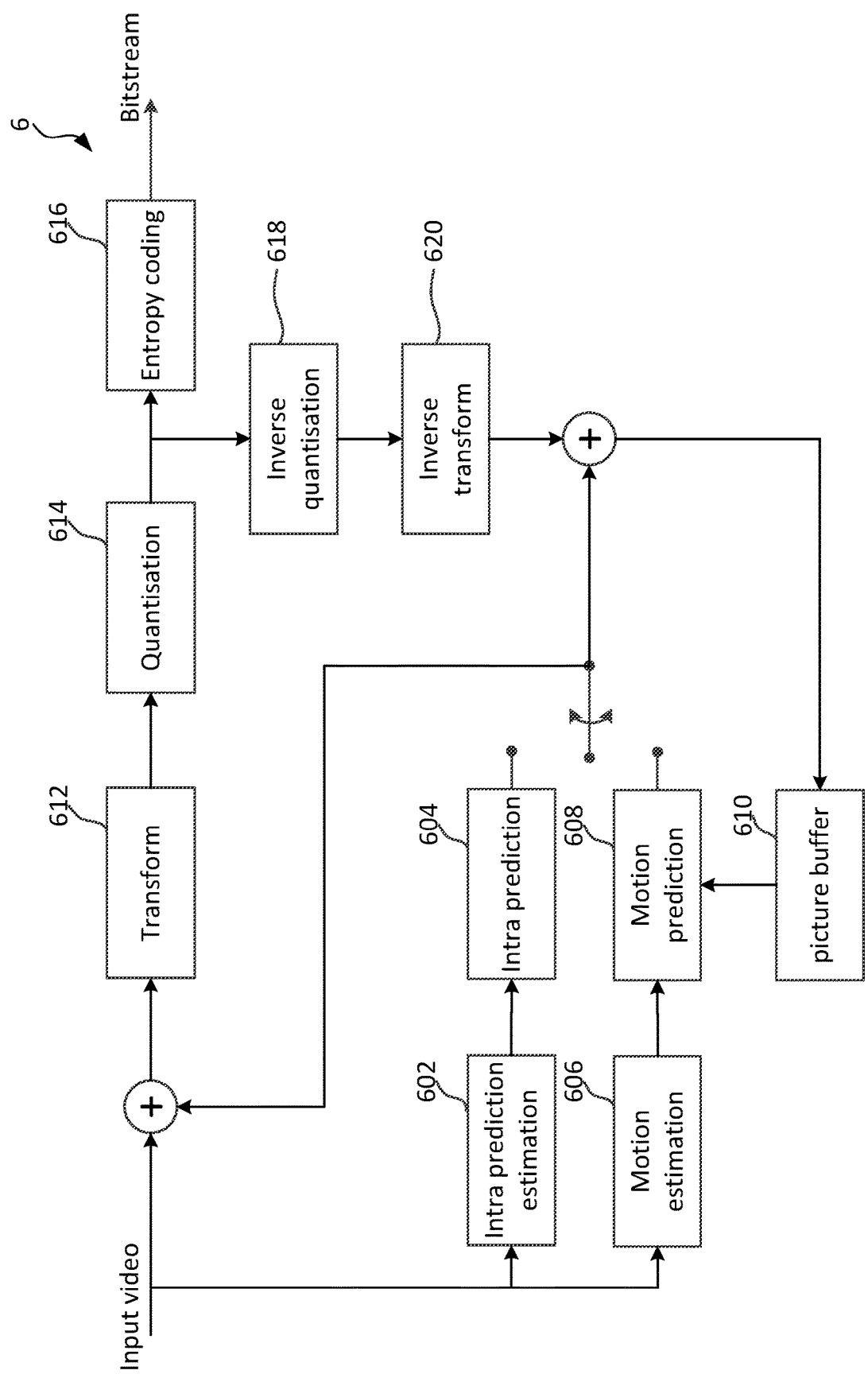
FIG. 6 shows a video encoder.

FIG. 6 shows an encoder 6, as may be used to obtain a bitstream that is readable by the decoder 1 described with reference to FIG. 1.

An input video stream has an intra prediction estimate 602 and/or a motion estimation 606 performed which identify spatial and/or temporal redundancies. These lead to an intra prediction 604 and a motion prediction 608, the motion prediction being dependent upon a picture from a picture buffer 610, which holds a picture equivalent to a previous frame encoded by the encoder 6.

The intra prediction 604 and/or the motion prediction 608 are combined with the input video and then transformed 612, quantised 614, and entropy coded 616 to obtain a bitstream. The transformed 612 and quantised 614 data stream typically undergoes inverse quantisation 618 and inverse transformation 620 to obtain a reference frame that is used by the picture buffer 610 for subsequent frames, although in some embodiments, either or both of these steps may not be essential.

In various embodiments, the intra prediction stage comprises one or more of: a bit that specifies whether multiple intra-prediction modes being used; a section that indicates at least one of the first and second prediction modes to use; a section that indicates the weightings of the first and second predictions modes. The indication of the modes to use and/or the weightings to use is, in some embodiments, a reference to the index of a lookup table. The lookup table to use is preferably determined by a characteristic of the present frame (e.g. the present block or a previous block) or a previous frame.

Within the encoder a list of possible intra-prediction modes is considered, where the combination of modes that results in the lowest residual values is that used—or a single mode is used if this achieves the lowest residuals. In some embodiments, a limited number of possible modes is considered, for example one of the multiple prediction modes may always be planar. In some embodiments, a certain improvement over using a single prediction mode is required before multiple intra-prediction modes are used.

Similarly, the weightings are determined using a predetermined methodology, for instance, a decision process that consists in selecting the weightings resulting in a minimum residual value. It will be appreciated by a person skilled in the art that other decision processes could be used.

ALTERNATIVES AND MODIFICATIONS

In various embodiments, a block as used herein refers to a prediction unit (PU), a coding unit (CU) and/or a transform unit (TU), e.g. as defined within the HEVC/H.265 version 5 standard of 13 Feb. 2018. More generally, a block may refer to any group of pixels. Preferably, a block refers to a group of connected pixels where these may be spatially connected.

In some embodiments, a block relates to a group of pixels that share common reference samples for the purposes of intra-prediction. This does not require each pixel value within the block to be predicted directly from the reference samples; in some embodiments, pixel values within a block may be predicted using other pixel values within the same block, those other pixel values being predicted using the common reference samples. In these embodiments, the predicted pixel values can each be considered to be derived from the reference samples.

While the method has been described with reference to use for frames within a videostream, it could similarly be used for still images, such as those conforming to the standards of the Joint Photographic Experts Group (JPEG).

While the detailed description has primarily related to the use of two prediction modes, this method could similarly be applied to any number of (two or more) prediction modes, where the number of modes used and/or the modes used may be indicated by information included in the relevant bitstream.

It will be understood that the present invention has been described above purely by way of example, and modifications of detail can be made within the scope of the invention.

Reference numerals appearing in the claims are by way of illustration only and shall have no limiting effect on the scope of the claims.

The invention claimed is:

1. A method of decoding, in a decoder, a bitstream representing an image, wherein the bitstream comprises a plurality of blocks of residual samples, and one or more reconstructed image frames of the image are obtained by adding a respective block of residual samples to a combined hypotheses block of intra-predictions, the combined hypotheses block of intra-predictions being formed by applying a method comprising:
 receiving the bitstream;
 for each block of residual samples:
  determining if a combined intra-prediction hypothesis is indicated by and/or can be inferred from the bitstream and, if so:
  for each block of residual samples of a block for which a combined intra-prediction hypothesis is indicated and/or can be inferred:
   determining a first intra-prediction mode from information extracted from the bitstream;
   inferring at least a second, different, intra-prediction mode based upon the first intra-prediction mode;
   applying the first intra-prediction mode to at least one reference sample to form a first hypothesis prediction sample;
   applying the at least one second intra-prediction mode to said at least one reference sample to form a second hypothesis prediction sample; and
   forming a combined hypotheses block of predictions by combining the first and second hypothesis prediction samples formed for the block;
  wherein inferring the second intra-prediction mode comprises inferring the second intra-prediction mode is a planar intra-prediction mode if the first prediction mode is not a planar intra-prediction mode.

2. The method of claim 1, wherein, for one or more blocks of residual samples of a block for which a combined intra-prediction hypothesis is indicated and/or inferred, the method of forming a combined hypothesis block of intra-predictions comprises, for each residual sample of the block, applying the first intra-prediction mode to a reference sample, applying the second intra-prediction mode to the same reference sample, and combining the resultant first and second hypothesis intra-prediction samples to form a combined hypotheses prediction sample, the method further comprising combining the combined hypotheses prediction samples thus obtained for the block to form said combined hypothesis block of intra-predictions.

3. The method of claim 1, wherein, for one or more blocks of residual samples for which a combined intra-prediction hypothesis is indicated and/or inferred, the method of forming a combined hypotheses block of intra-predictions comprises applying said first intra-prediction mode to all of the reference samples of the said block to form a plurality of first hypothesis prediction samples, applying the second intra-prediction mode to all of the reference samples of the said block to form a plurality of second hypothesis prediction samples, and combining the first and second hypothesis prediction samples to form said combined hypotheses block of intra-predictions.

4. The method of claim 1, wherein the second intra-prediction mode is determined based upon an indicator within the bitstream.

5. The method of claim 1, wherein combining the first and second combined hypothesis intra-prediction samples to form said combined hypotheses block of predictions comprises one or more of:
 adding said first and second hypothesis prediction samples to respective said residual samples;
 computing a weighted average of the first and second combined hypotheses intra-prediction samples;
 determining weightings to be applied to the first and/or second hypothesis samples; and
 adding a weighted combination thereof to respective residual samples.

6. The method of claim 5, wherein weightings applied to the first and/or second hypothesis intra-prediction samples are determined based upon the values of bits within the bitstream.

7. The method of claim 5, wherein weightings applied to the first and/or second hypothesis intra-prediction samples are obtained by querying a lookup table.

8. The method of claim 5, wherein the weightings applied to the first and/or second hypothesis intra-prediction samples are at least partially inferred using information extracted from the neighbouring blocks.

9. The method of claim 1, wherein at least one of the first intra-prediction mode and the second intra-prediction mode is a planar intra-prediction mode.

10. The method of claim 1, wherein at least one of the first intra-prediction mode and the second intra-prediction mode is a DC intra-prediction mode.

11. The method of claim 1, wherein at least one of the first intra-prediction mode and the second intra-prediction mode is a directional intra-prediction mode.

12. The method of claim 1, wherein the bitstream comprises one or more bits indicating whether a second directional intra-prediction mode is to be applied.

13. The method of claim 1, wherein the bitstream comprises one or more bits indicating the first intra-prediction mode and/or the second intra-prediction mode to be applied.

14. The method of claim 13, wherein determining the first intra-prediction mode and/or the second intra-prediction mode comprises querying a lookup table.

15. The method of claim 1, further comprising, in respect of a block for which a combined intra-prediction hypothesis is indicated and/or inferred: determining a third intra-prediction mode; and applying the third intra-prediction mode to one or more reference samples to form a third hypothesis intra-prediction sample, and combining the first, second and third hypothesis prediction samples formed for a block, to create a said combined hypotheses block of predictions.

16. A method of decoding, in a decoder, a bitstream representing an image, wherein the bitstream comprises a plurality of blocks of residual samples, and one or more reconstructed image frames of the image are obtained by adding a respective block of residual samples to a combined hypotheses block of intra-predictions, the combined hypotheses block of intra-predictions being formed by applying a method comprising:
  receiving the bitstream;
  for each block of residual samples:
    determining if a combined intra-prediction hypothesis is indicated by and/or can be inferred from the bitstream and, if so:
    for each block of residual samples of a block for which a combined intra-prediction hypothesis is indicated and/or can be inferred:
      determining a first intra-prediction mode from information extracted from the bitstream;
      inferring at least a second, different, intra-prediction mode based upon the first intra-prediction mode;
      applying the first intra-prediction mode to at least one reference sample to form a first hypothesis prediction sample;
      applying the at least one second intra-prediction mode to said at least one reference sample to form a second hypothesis prediction sample; and
      forming a combined hypotheses block of predictions by combining the first and second hypothesis prediction samples formed for the block;
    wherein inferring the second intra-prediction mode comprises:
      determining if the first intra-prediction mode is a planar intra-prediction mode; and
      inferring a combined intra-prediction hypothesis only if the first prediction mode is not a planar prediction mode.

* * * * *